United States Patent
Baltes et al.

(10) Patent No.: US 10,364,726 B2
(45) Date of Patent: Jul. 30, 2019

(54) METHOD FOR HEATING AN OPERATING AGENT, AND AN OPERATING AGENT HEATING SYSTEM

(71) Applicant: SIEMENS AKTIENGESELLSCHAFT, Munich (DE)

(72) Inventors: Joerg Baltes, Groebenzell (DE); Stefan Hintermeir, Aschau I. Ch (DE)

(73) Assignee: Siemens Aktiengesellschaft, Munich (DE)

(*) Notice: Subject to any disclaimer, the term of this patent is extended or adjusted under 35 U.S.C. 154(b) by 136 days.

(21) Appl. No.: 15/531,513

(22) PCT Filed: Nov. 18, 2015

(86) PCT No.: PCT/EP2015/076925
§ 371 (c)(1),
(2) Date: May 30, 2017

(87) PCT Pub. No.: WO2016/083202
PCT Pub. Date: Jun. 2, 2016

(65) Prior Publication Data
US 2017/0328254 A1 Nov. 16, 2017

(30) Foreign Application Priority Data
Nov. 27, 2014 (DE) .................. 10 2014 224 287

(51) Int. Cl.
*F01N 3/20* (2006.01)
*F02G 5/00* (2006.01)
(Continued)

(52) U.S. Cl.
CPC .............. *F01N 3/208* (2013.01); *B61C 5/04* (2013.01); *F01N 3/2896* (2013.01); *F02G 5/00* (2013.01);
(Continued)

(58) Field of Classification Search
CPC .......... F01N 2610/10; F01N 2610/105; F01N 2610/1433; F01N 2610/144
See application file for complete search history.

(56) References Cited

U.S. PATENT DOCUMENTS

| 5,884,475 A | 3/1999 | Hofmann et al. |
| 8,495,960 B2 | 7/2013 | Willbrandt et al. |
| 2010/0242439 A1 | 9/2010 | Domon et al. |

FOREIGN PATENT DOCUMENTS

| DE | 4432576 A1 | 3/1996 |
| DE | 19935920 A1 | 3/2001 |

(Continued)

OTHER PUBLICATIONS

Machine translation of DE102011015196A1, accessed Dec. 6, 2018.*

*Primary Examiner* — Jonathan R Matthias
(74) *Attorney, Agent, or Firm* — Laurence Greenberg; Werner Stemer; Ralph Locher (57) ABSTRACT

In a method for heating an operating agent for a rail vehicle, particularly for heating a reducing agent for the aftertreatment of exhaust gas, a coolant liquid is pumped through a cooling circuit of the internal combustion engine by a pump when an operating agent heating system is in an operating mode. In the operating mode, the coolant liquid is pumpable through a main heating circuit by of the pump in order to heat the operating agent in a reservoir. When the operating agent heating system is in a preheating mode, the main heating circuit is divided into two sub-circuits of a preheating circuit, the flow being able to pass through both of the sub-circuits.

14 Claims, 6 Drawing Sheets

(51) Int. Cl.
*B61C 5/04* (2006.01)
*F01N 3/28* (2006.01)
(52) U.S. Cl.
CPC ....... *F01N 2610/10* (2013.01); *F01P 2070/52* (2013.01); *Y02T 10/166* (2013.01)

(56) References Cited

FOREIGN PATENT DOCUMENTS

| | | |
|---|---|---|
| DE | 102008011329 A1 | 9/2009 |
| DE | 102011015196 A1 | 9/2012 |
| EP | 1662103 A1 | 5/2006 |
| EP | 2175111 A1 | 4/2010 |
| EP | 2226479 A1 | 9/2010 |

* cited by examiner

METHOD FOR HEATING AN OPERATING AGENT, AND AN OPERATING AGENT HEATING SYSTEM

BACKGROUND OF THE INVENTION

Field of the Invention

The invention relates to a method for heating an operating agent for a rail vehicle, particularly for heating a reducing agent for the aftertreatment of exhaust gas. The invention further relates to operating agent heating system for a rail vehicle, particularly for heating a reducing agent for the aftertreatment of exhaust gas. The invention further relates to a drive, particularly a diesel drive, for a rail vehicle or motor vehicle or to a rail or motor vehicle. This document claims the priority of the German patent application DE 10 2014 224 287 A1. (Nov. 27, 2014), the disclosure contents of which are hereby included by reference thereto.

The exhaust gas limit values for vehicles, particularly for rail vehicles and motor vehicles, are becoming ever more stringent. In some cases the newest exhaust gas limit values will only be achieved with an SCR (Selective Catalytic Reduction) system for selective catalytic reduction of nitrogen oxides in exhaust gas of internal combustion engines, which operates with a urea solution, which must also be carried on the vehicle. Current urea solutions have the property that, depending on the urea content, they can freeze from around −10°. Correct operation of the vehicle is then no longer possible. The exhaust gas limit values can no longer be adhered to when the urea solution is frozen. A frozen urea solution is not destroyed and can be used again after a thawing process.

For this reason it may be necessary to integrate a heating or warming concept into a reservoir for the urea solution.

In such cases both different operating states of the vehicle and also different ambient temperatures must be investigated. Furthermore it should be insured that urea solutions are not allowed to exceed a specific maximum temperature of around +60°. This means that the heating concept requires an open-loop or closed-loop temperature control, so that both a minimum temperature and also a maximum temperature of the urea solution will not be exceeded.

With a rail vehicle in particular, with a diesel locomotive for example, this leads to the following problem. When the internal combustion engine of the rail vehicle is running, the on-board network of the rail vehicle is completely activated and all open-loop control, closed-loop control and/or monitoring circuits of the rail vehicle are active. In this operating state a heating of a urea container of the rail vehicle can be monitored. If however one also wishes to supply heat to the urea container in a preheating mode, open-loop or closed-loop control of the temperature via an on-board network is not possible, because the on-board network and all open-loop control, closed-loop control and/or monitoring circuits are switched off in the preheating mode of the rail vehicle.

SCR exhaust gas systems are known in trucks. With a truck too a reservoir of a urea solution (mostly AdBlue®) will be heated by a coolant liquid of the truck, which however, as has been explained above, is only active during operation of the truck. Since with a truck the amount of urea solution stored is considerably smaller than with a comparatively large rail vehicle, in the event of the urea solution being frozen, the urea solution can quickly be thawed out again.

DE 199 35 920 A1 discloses an apparatus and a method for heating a reservoir for urea solution of an aftertreatment of exhaust gas system of an internal combustion engine for a commercial vehicle. The urea solution stored in the reservoir is able to be heated by the waste heat of the internal combustion engine, wherein a coolant liquid of the internal combustion engine will be carried through heating tubes in the reservoir. A comparatively large volume of urea solution is able to be thawed out here in relation to the size of the reservoir. A heat exchanger and thermostat valves are provided to limit the temperature of the urea solution.

EP 2 226 479 A1 teaches an electric heating device with a plurality of heating elements for a reservoir of a urea solution for a system for the aftertreatment of exhaust gas of an internal combustion engine of a motor vehicle as well as a method for melting a urea solution frozen in the reservoir. In order to melt a volume of the urea solution there is provision for the heating device to have a control unit, through which electrical heating elements are able to be operated individually or in groups in turn for melting the volume.

In a larger internal combustion engine, which is of an order of magnitude between an internal combustion engine for a truck and an internal combustion engine for a rail vehicle, a similar process will be applied. As soon as the internal combustion engine is switched on, an open-loop or closed-loop control system within the internal combustion engine takes over a supply of cooling water into the reservoir of the urea solution. Should the temperature of the urea solution fall below a threshold value, then this valve opens and coolant liquid from the internal combustion engine flows through the reservoir to heat the urea solution. When an upper threshold value temperature is reached this valve closes again.

DE 10 2008 011 329 A1 discloses a rail vehicle with an internal combustion engine and an SCR exhaust gas system connected to the internal combustion engine. The SCR exhaust gas system comprises a supply device for a urea solution, which is embodied to supply the urea solution to a flow of exhaust gas of the internal combustion engine. For this purpose the supply device has a reservoir for the urea solution. The supply device can further include a temperature-control device for cooling and/or heating the urea solution. For heating the urea solution the temperature control device can include an electrically-operated heating line and/or a heating line fed from a coolant circuit of the internal combustion engine.

SUMMARY OF THE INVENTION

An object of the invention is to specify an improved method for heating an operating agent for a rail vehicle, in particular for heating a reducing agent for aftertreatment of exhaust gas, and also an operating agent heating system for a rail vehicle, in particular for heating a reducing agent for aftertreatment of exhaust gas. The operating agent should always be available to the rail vehicle in a sufficient quantity here, apart from in an emergency situation, i.e. even when the vehicle is being started in outside temperatures of below around −10°. A further object of the invention is to provide a drive, in particular a diesel drive, for a rail vehicle or motor vehicle and to provide a rail vehicle or motor vehicle.

The object of the invention is achieved by means of a method for heating an operating agent for a rail vehicle, particularly for heating a reducing agent for aftertreatment of exhaust gas; by means of an operating agent heating system for a rail vehicle, particularly for heating a reducing agent for aftertreatment of exhaust gas; and by means of a drive, in particular a diesel drive, for a rail vehicle or motor vehicle, in accordance with the independent claims. Advantageous developments, additional features and/or advantages of the invention emerge from the dependent claims and/or from the description of the invention given below.

In the method, in one operating mode of an operating agent heating system, a coolant liquid will be pumped by a pump through a coolant circuit of the internal combustion engine, wherein further in this operating mode the coolant liquid can be pumped by the pump through a main heating circuit for heating the operating agent in a reservoir. In a preheating mode of the operating agent heating system the main heating circuit is divided into two sub-circuits of a preheating circuit through which the liquid can preferably flow in opposite directions. Here the coolant liquid in the two sub-circuits heated by a preheating device will be pumped by a pump in a preheating line or a pump of the preheating device through the two sub-circuits. In an optional thawing mode of the operating agent heating system the coolant liquid heated by the preheating device will be pumped by the pump in the preheating line of the pump of the preheating device through that sub-circuit of the preheating circuit which leads through the reservoir.

The inventive operating agent heating system has a coolant circuit for an internal combustion engine and a main heating circuit connected to the coolant circuit for heating an operating agent in a reservoir, wherein a coolant liquid able to be circulated through the main heating circuit is able to be pumped by means of a pump of the coolant circuit through the main heating circuit in one operating mode of the operating agent heating system, wherein the main heating circuit is able to be switched over by means of preheating line in a preheating circuit, by means of which the internal combustion engine and/or the operating agent in the reservoir is or are able to be preheated.

The main heating circuit can be able to be brought into a fluid communication with the coolant circuit upstream by means of a faucet and/or downstream by means of a faucet and/or a throttle. Here the faucet and the throttle can be connected in parallel. Furthermore the main heating circuit can have a valve, by means of which, on the basis of a temperature of the operating agent, a flow of coolant liquid through the main heating circuit is able to be set.

This valve is preferably embodied as a motorized valve and can be provided upstream of the heating device in the main heating circuit. The main heating circuit can also have at least one heating device in the reservoir, by means of which a column and possibly a cushion of the operating agent close to the floor is able to be heated or thawed out. In addition a region for sucking the operating agent into the reservoir or a suction opening of a suction nozzle can be able to be heated or thawed by means of an additional heating device. The preheating device can be embodied as a fuel-operated or as an electrical preheating device. Furthermore the pump is embodied as an internal combustion engine-driven pump or as an electrically-driven pump.

The preheating line with a preheating device can be coupled into the main heating circuit, wherein the preheating line is connected to the main heating circuit upstream and downstream of the heating device and is preferably able to be brought into a fluid communication with the main heating circuit by means of two faucets.

The preheating circuit preferably has two sub-circuits, wherein in a preheating mode of the operating agent heating system the coolant liquid is able to be circulated in opposite directions in the two sub-circuits. In the preheating mode the coolant liquid is able to be pumped through the two sub-circuits from a pump in the preheating line and/or a pump of the preheating device. Furthermore, in the preheating mode, the coolant liquid is able to flow though a sub-circuit of the preheating circuit in parallel to the coolant circuit of the internal combustion engine.

The operating agent heating system can be embodied such that, during a switchover from preheating mode into the operating mode and vice versa, there is a reversal of a direction of circulation through the lines of the main heating circuit, wherein in preheating mode the valve in the main heating circuit is bridged via a non-return valve in the main heating circuit. For this the valve and the non-return valve are preferably connected in parallel. Furthermore a pump can be provided downstream or upstream of the preheating device in the preheating line, which is not identical to a pump of the preheating device.

In a thawing mode of the operating agent heating system the coolant liquid is preferably only able to be circulated in that sub-circuit of the preheating circuit which leads through the reservoir. Here the faucet of the main heating circuit or of the other sub-circuit of the preheating circuit can be closed and the faucets in the preheating line can be opened. In the preheating mode and/or in the thawing mode the internal combustion engine and/or the pump is/are inactive. The preheating line can have a pressure-limiting valve, wherein the pressure-limiting valve is preferably provided between a pressure side of the pump of the coolant circuit and the preheating device in the preheating line, whereby the preheating device is able to be protected in an emergency start mode of the operating agent heating system.

The invention is explained in greater detail below on the basis of exemplary embodiments of two forms of embodiment of a variant, which refers to the enclosed drawing. Elements, modules or components that possess an identical, univocal or similar embodiment and/or function, are provided with the same reference characters in the description of the figures, the list of reference characters and the claims, and/or are identified in the figures by the same reference characters. Possible alternatives, static and/or kinematic variations, combinations etc. to the forms of embodiment shown and/or to the explained exemplary embodiments of the invention or individual modules, parts or sections thereof that are not explained in the description, not shown in the drawings and/or not conclusive, can be taken from the list of reference characters.

All explained features, including those of the list of reference characters, are able to be used not only in the specified combination or in the specified combinations, but also in another combination or in other combinations or on their own. In particular it is possible, on the basis of the reference character and the features in the description of the invention, the figure description and/or the list of reference characters assigned to said character, to replace a feature or a plurality of features in the description of the invention and/or the figure description. Furthermore this enables a feature or a plurality of features in the claims to be interpreted, specified in greater detail and/or substituted. In the figures (FIG.) of the drawing:

DESCRIPTION OF THE INVENTION

The invention is explained in greater detail below on the basis of exemplary embodiments of a variant (cf. FIGS. 1 to 6) of a method for heating an operating agent 302 and of an operating agent heating system 3 for a vehicle drive 1 of a rail vehicle. However the invention is not restricted to such a variant and/or to the forms of embodiment described below, but is of a more basic nature, so that it can be applied to all drives 1 within the meaning of the invention, e.g. to motor vehicles as well. Although the invention is described in greater detail and illustrated by preferred exemplary embodiments, the invention is not restricted by these preferred embodiments. Other variations can be derived herefrom without departing from the scope of protection of the invention.

Figure 1:
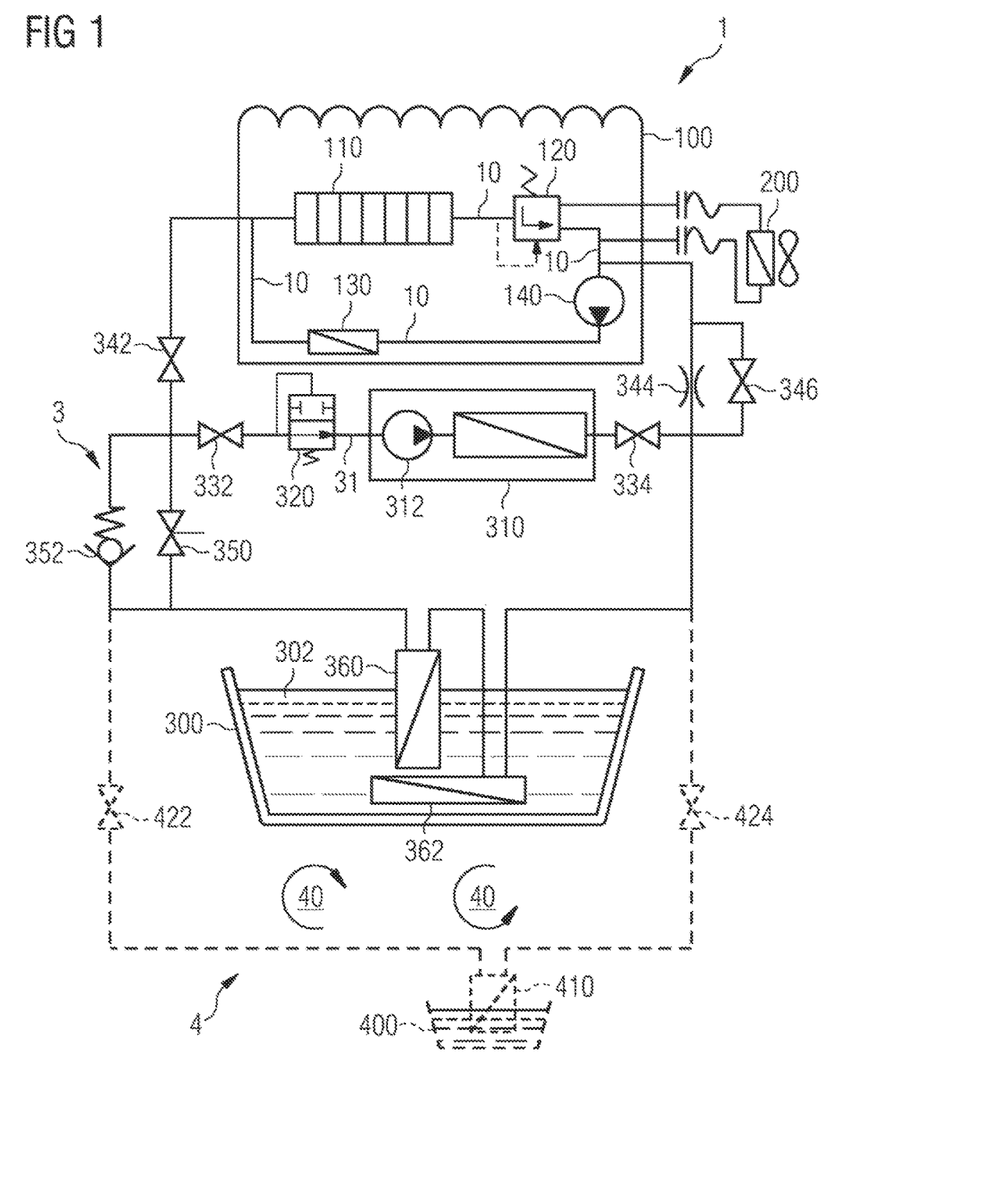
FIG. 1 shows a schematic view of a vehicle drive for a rail vehicle with an inventive operating agent heating system, when the rail vehicle is shut down.
Figure 2:
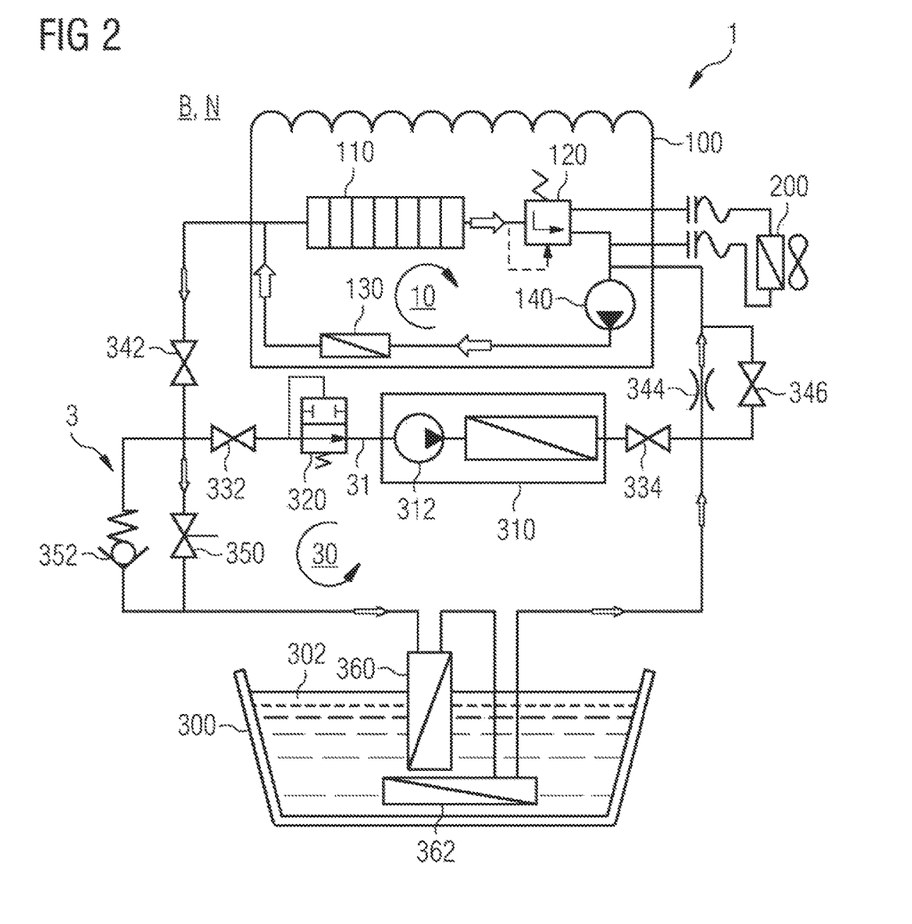
FIG. 2 shows a schematic view of the inventive vehicle drive from FIG. 1, wherein an operating mode and an emergency start mode of the rail vehicle are shown.

FIG. 2 shows a known active or configured coolant circuit 10 (arrows) of an internal combustion engine 100, in particular of a diesel engine 100, of the vehicle drive 1 of the rail vehicle, with e.g. the standard components of a plurality of cylinders 110 to be cooled, a thermostat 120, an oil cooler 130, an engine pump 140 etc. The fluid lines or a line system for a coolant liquid of the coolant circuit 10, preferably a water-glycol mixture, lead in this case through the internal combustion engine 100 and past its cylinders 110 (see also below). In addition FIG. 1, which shows the operating agent heating system 3 in a shut-down state, and FIG. 2, show an external cooler 200, through which the coolant liquid, in particular in warmed-up operating state of the internal combustion engine 100 or of the vehicle drive 1, is able to be conveyed, so that said liquid can emit its heat taken up in the internal combustion engine 100 to the surroundings.

FIG. 2 further shows an inventively active or configured main heating circuit 30 (arrows) of the operating agent heating system 3 for a reservoir 300 of an operating agent 302, in particular of a reducing agent 302 for a system for aftertreatment of exhaust gas, of the rail vehicle. Preferably the reducing agent 302 is a urea solution 302. The fluid lines or a line system of the main heating circuit 30 in this case is or are preferably connected to the coolant circuit 10 and can establish a connection to said circuit in a preferably direct fluid-mechanical connection. I.e. when the conditions in the reservoir 300 require this, the coolant liquid can flow through the main heating circuit 30 as a heating medium for the operating agent 302 in the reservoir 300. I.e. the main heating circuit 30 enables waste heat of the internal combustion engine 100 to be used for heating the operating agent 302.

The main heating circuit 30 for the reservoir 300, in addition to the fluid lines, features e.g. the preferably heat-insulated reservoir 300 for the operating agent 302, in particular the urea solution 302, a preferably motorized valve 350, a non-return valve 352, a heating device 360 preferably embodied as a multifunction unit 360 and possibly an additional heating device 362 in the reservoir 300. If need be, this scheme can be expanded with an additional heating circuit 40 of an additional heater 4 for a further fluid or for a further operating agent, e.g. a fuel, for the rail vehicle. I.e. the additional heating circuit 40 can be connected to the main heating circuit 30, to a preheating circuit 32; 32.1, 32.2 (see below) and/or a thawing circuit 34 (see below), which is able to be connected fluid-mechanically to this circuit or these circuits by means of faucets 422, 424 that can be actuated manually or automatically. Naturally a number of additional heating circuits 40 can also be provided.

Figure 3:
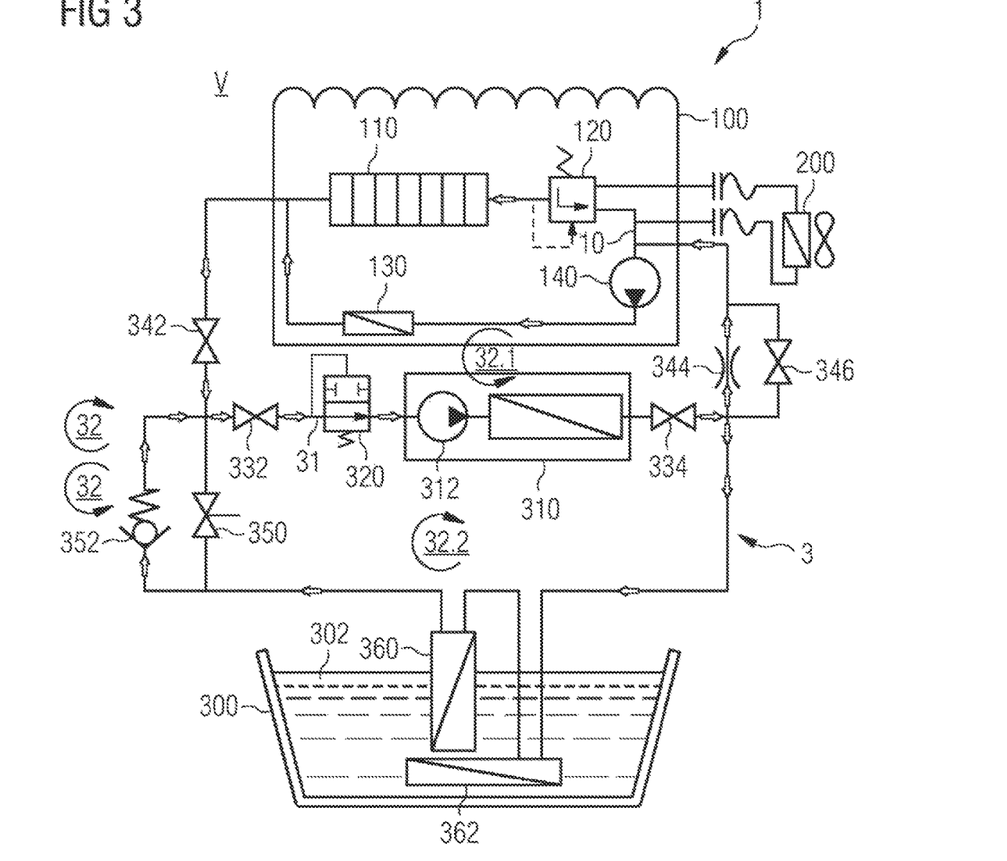
FIG. 3 shows a schematic view of the inventive vehicle drive from FIG. 1, wherein a preheating mode of an internal combustion engine and a reservoir of the rail vehicle are shown.

FIG. 3 shows an inventively active or configured preheating circuit 32 (arrows) of the operating agent heating system 3 for the reservoir 300 or the operating agent 302. The fluid line(s) or a line system for realizing the preheating circuit 32 is/are in this case preferably coupled into the main heating circuit 30 or are connected thereto and can be brought into a preferably direct fluid-mechanical connection therewith, wherein the preheating circuit 32 divides the main heating circuit 30 such that said circuit leads through the internal combustion engine 100 (first sub-circuit 32.1) and/or through the reservoir 300 (second sub-circuit 32.2). I.e. in accordance with the invention, through the preheating circuit 32, the coolant liquid can serve as a heating medium for the internal combustion engine 100 and/or the operating agent 302 in the reservoir 300, when conditions in the internal combustion engine 100 or the reservoir 300 require this.

A heat not generated by the internal combustion engine 100 will be used by means of the preheating circuit 32 for heating the internal combustion engine 100 and/or the operating agent 302 (see below; preheating device 310 in preheating line 31). In forms of embodiment of the invention only the internal combustion engine 100 or only the operating agent 302 can be heated by the preheating circuit 32 (not shown in FIG. 3). Here the other sub-circuit 32.1/32.2 of the preheating circuit 32 is inactive in each case. Naturally, as shown in FIG. 3, it is possible for both the internal combustion engine 100 and also the operating agent 32 to be heated by the preheating circuit 32, wherein both sub-circuits 32.1, 32.2 of the preheating circuit 32 (arrows) are active. In all forms of embodiment of a preheating circuit 32 it is preferred that coolant liquid flows through the coolant circuit 10 of the internal combustion engine 100 in parallel.

The preheating circuit 32 for the reservoir 300 or for the operating agent 302 located therein, as well as fluid lines, referred to as the preheating line 31, in addition to the components of the main heating circuit 30 mentioned above, features a preheating device 310, a pressure-limiting valve 320 and the faucets 332, 334 able to be actuated manually or automatically. In a fluid connection between the preheating circuit 32 and the coolant circuit 10 of the internal combustion engine 100, i.e. in that section of the main heating circuit 30 which does not belong to the preheating circuit 32, the main heating circuit 30 preferably has a faucet 342, a throttle 344 and a faucet 346 of a bypass (bypass faucet 346). The faucets 324, 346, for their part, are able to be actuated manually or automatically.

Figure 4:
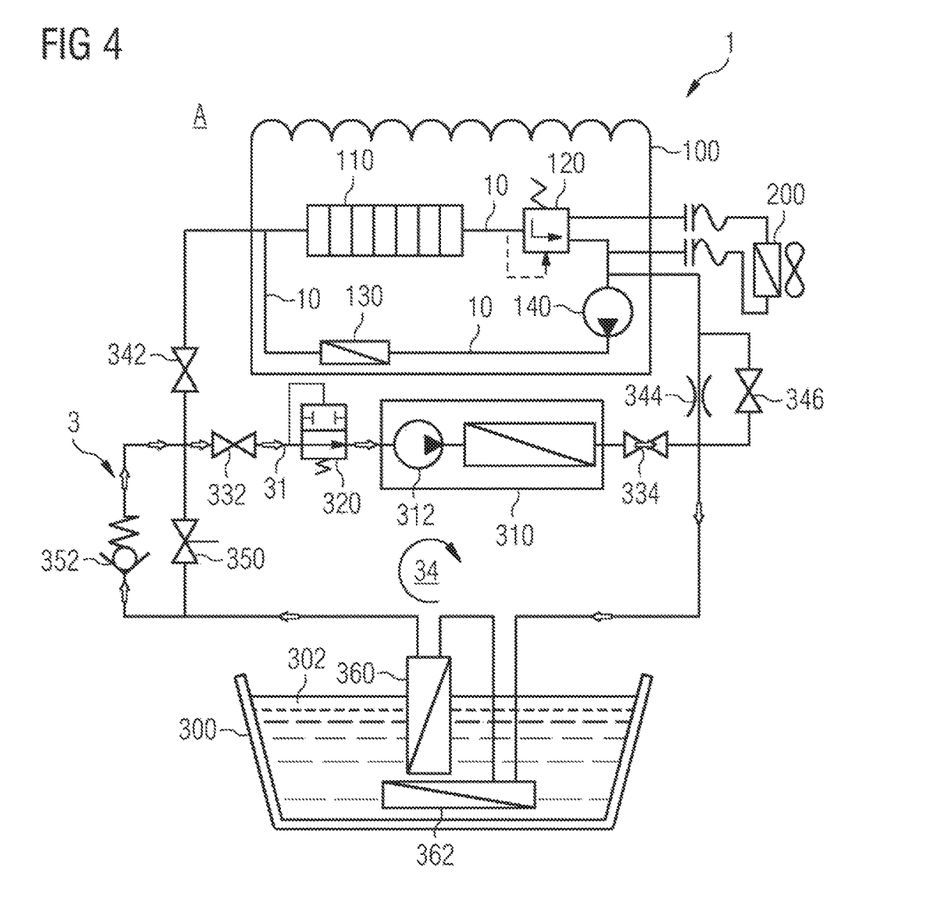
FIG. 4 shows a schematic view of the inventive vehicle drive from FIG. 1, wherein a thawing mode for an operating agent in the reservoir of the rail vehicle is shown.

FIG. 4 shows an inventively active or configured thawing circuit 34 (arrows) of the operating agent heating system 3 for the reservoir 300 or for the operating agent 302. The fluid line(s) or a line system for realizing the thawing circuit 34 is/are preferably coupled into the main heating circuit 30 in this case or connected thereto and can be brought into a preferably direct fluid-mechanical connection therewith, wherein the thawing circuit 34 bridges over the main heating circuit 30 such that this only still leads through the reservoir 300. I.e. in accordance with the invention the coolant liquid can flow through the thawing circuit 34, as a heating medium for the operating agent 302 in the reservoir 300, when the conditions in the reservoir 300 require it.

In this case, by means of the thawing circuit 34, heat not generated by the internal combustion engine 100 will be used to heat the operating agent 302 (once again see below; preheating device 310). In accordance with the invention the thawing circuit 34 can be substantially identical to the second sub-circuit 32.2 of the preheating circuit 32 (cf. the sub-circuit 32.2 in FIG. 3 with the thawing circuit 34 in FIG. 4). Furthermore the liquid can also flow through the thawing circuit 34 in a direction of circulation opposite to that depicted in FIG. 4. This can also be applied to the main heating circuit 30, the preheating circuit 32 and/or the sub-circuit(s) 32.1, 32.2 of the operating agent heating system 3.

Figure 5:
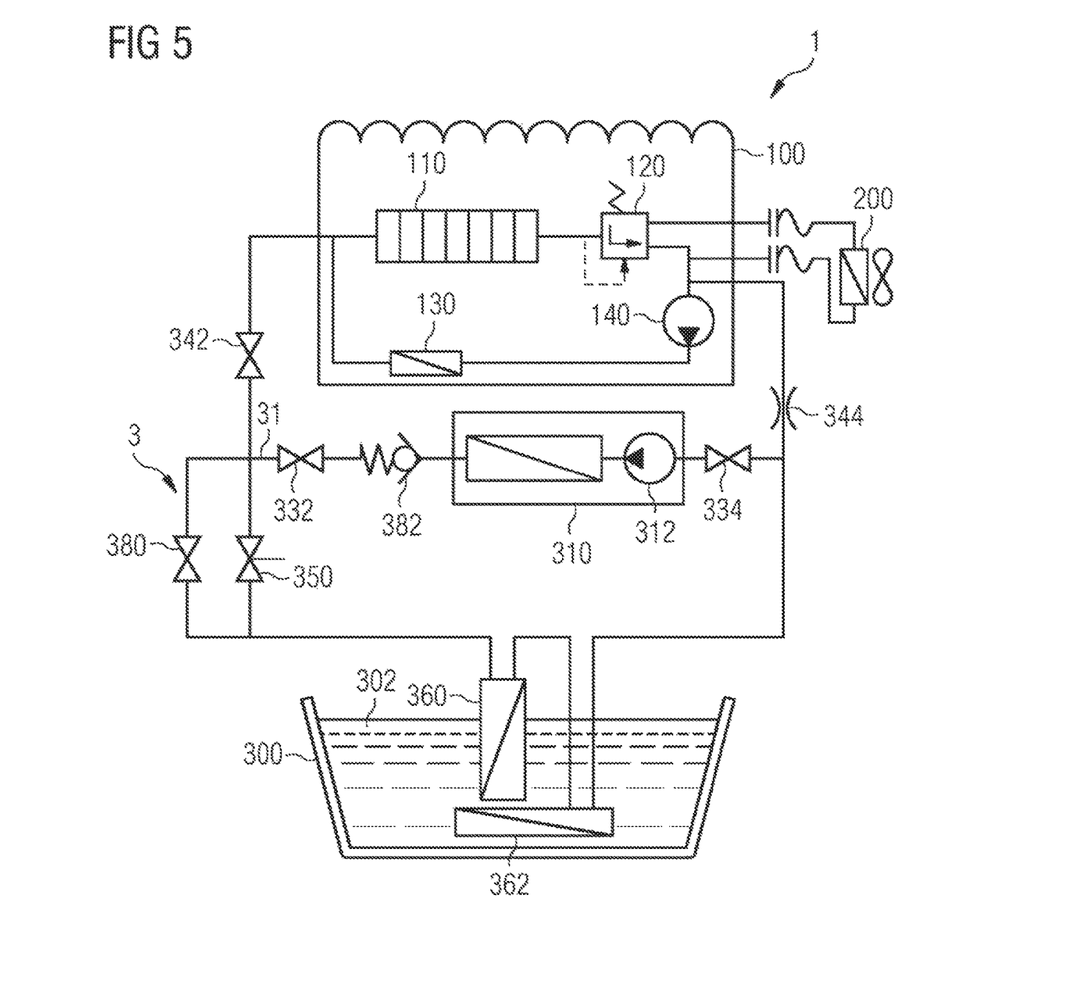
FIG. 5 shows a schematic view of an alternate vehicle drive for a rail vehicle with an inventive operating agent heating system, when the vehicle is shut down.

The schemes shown in FIG. 1 to FIG. 5 cover the following operating cases of the rail vehicle, the vehicle drive 1 or the internal combustion engine 100: Shut down (FIG. 1), internal combustion engine running or vehicle drive 1 running, or emergency start (switching on the internal combustion engine 100 or the vehicle drive 1 when the internal combustion engine 100 may possibly be cold) of the rail vehicle (operating mode B, emergency start mode N, FIG. 2) a preheating mode of operation of the internal combustion engine 100 or of the vehicle drive 1 and/or of the reservoir 300 (preheating mode V, FIG. 3) as well as thawing mode of operation of the reservoir 300 (thawing mode A, FIG. 4). Furthermore FIG. 5 shows a bypass solution similar to FIG. 1.

The operating mode B shown in FIG. 2 is only active with a running or a sufficiently hot or operationally-hot internal combustion engine 100, wherein the engine pump 140 is active. Here the coolant liquid circulates on the one hand in the internal combustion engine 100 through the cylinders 110, through the thermostat 120, through the cooler 200, through the engine pump 140 and through the oil cooler 130 (preferably in this order), i.e. in the coolant circuit 10. On the other hand the coolant liquid also circulates through the main heating circuit 30, i.e. starting from an inlet of the main heating circuit 30 on the coolant circuit 10, through the faucet 342, the valve 350, the heating device 360, possibly the additional heating device 362 and the throttle 344 (preferably in this order) via an outflow of the main heating circuit 30 on the coolant circuit 10 back into the coolant circuit 10.

No coolant liquid flows through the preheating circuit 32 or one of the two sub-circuits 32.1, 32.2 of the preheating circuit 32, because the faucets 332 and 334 are closed. With the internal combustion engine 100 switched on and running, all closed-loop control, open-loop control and/or monitoring circuits of the rail vehicle are active. The motorized valve 350 controls or regulates, on the basis of a temperature of the operating agent 302, for which a sensor is provided on/in the reservoir 300, a feed of coolant liquid through the main heating circuit 30, which leads through the reservoir 300. In this way overheating of the operating agent 302 can be prevented. A bypass 352 (non-return valve 352) will be closed by the pressure conditions in the main heating circuit 30.

In the preheating mode V depicted in FIG. 3 only a pump 312 of the preheating device 310 is running. The internal combustion engine 100 and its engine pump 140 are switched off in preheating mode V. The basis for this operating state is that a temperature of the coolant liquid lies below a starting threshold for the internal combustion engine 100. In this operating state the coolant liquid flows both through the internal combustion engine 100 and also through the reservoir 300 or through the operating agent 302 located therein. Should it be necessary, a volume flow through the reservoir 300 can be set by means of the throttle 344. However the option of prioritizing a preheating of the internal combustion engine 100 also exists, in that the throttle 344 (flap) will be bridged over via a bypass 346 (faucet 346).

The reservoir 300 will preferably always be heated when the preheating mode V is active. During the preheating mode V operating state almost all closed-loop control, open-loop control and/or monitoring circuits of the rail vehicle are switched off. This means that the motorized valve 350 cannot take over the temperature control or regulation, it remains closed. The coolant liquid flows in this operating state via the bypass 352, i.e. through the non-return valve 352. The faucets 332, 334 are opened in this operating case. It is naturally also possible to suppress the preheating of the reservoir 300 in the preheating mode V (not shown).

Despite this, overheating of the operating agent 302 is not possible, because the preheating device 310 possesses an internal temperature control or regulation, which controls or regulates a temperature of the coolant liquid between the temperature thresholds for starting the internal combustion engine 100. The upper temperature threshold for starting the internal combustion engine 100 is below the temperature at which the operating agent 302 would sustain damage. Freezing of the operating agent 302 is likewise excluded, since at low external temperatures the internal combustion engine 100 likewise cools down and thus the temperature of the coolant liquid falls below a start temperature of the internal combustion engine 100, which results in an automatic switching-on of the preheating device 310.

Should the rail vehicle be left for a long period in an environment with low temperatures, the operating agent 302 in the reservoir 300 can freeze partly or completely. If the operating agent 302 is urea solution 302 for example, then this is not damaged in such a case and only has to be thawed out for putting the rail vehicle into service. For this case a thawing mode A will be activated, which is shown in FIG. 4. In this case the entire heating power of the preheating device 310 will preferably be used to thaw out the frozen operating agent 302. For the thawing mode A the faucet 342 will be closed and the faucets 332, 334 will be opened. Thus the coolant liquid circulates only through the preheating device 310 and the reservoir 300.

Figure 6:
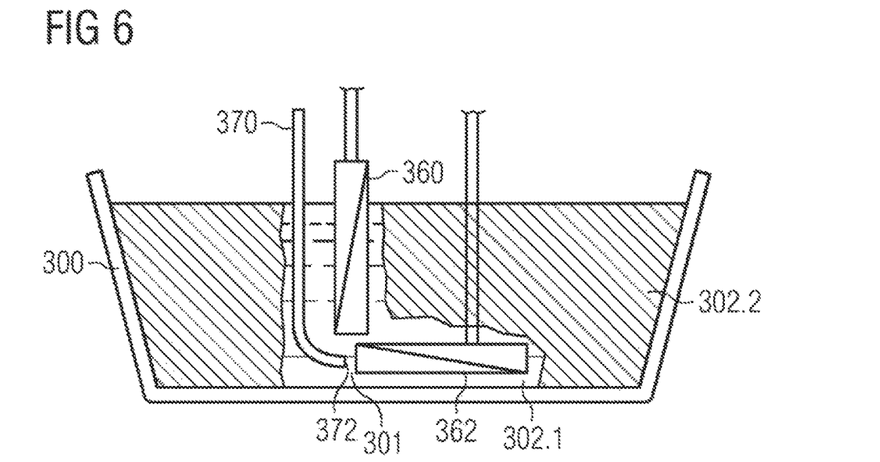
FIG. 6 shows a schematic view of a cutaway reservoir to clarify a position of a suction opening for sucking in an operating agent within the reservoir relative to a heating device.

Preferably a suction region 301 of the operating agent 302 in the reservoir 300 will primarily be heated (cf. FIG. 6). This will be realized by the heating device 360 of the preferably multifunctional suction apparatus, i.e. the multifunctional unit 360 and if necessary by the additional heating device 362 around a suction nozzle 370 (FIG. 6). As a result of this preferably double heating it can be safely assumed that the operating agent 302 will be liquefied in the suction region 301. The aim in this case is not to thaw as large a volume of the operating agent 302 as possible, but explicitly at least only around a suction opening 372 of a suction nozzle 370 for the operating agent 302 in the reservoir 300.

A heating element of the heating device 360 is preferably arranged vertically in the vicinity of the suction nozzle 370. It thus thaws a vertical liquid cylinder (liquid operating agent 302.1) in a frozen operating agent 302.2. The additional heating device 362 of the reservoir 300 preferably close to the floor thaws out the frozen operating agent 302.2 from below. Above all for a low volume of the operating agent 302 in the reservoir 300, more heat will be introduced into the frozen operating agent 302.2 by the additional heating device 362 close to the floor. With this arrangement of the heating devices 360, 362 a liquid cushion (liquid operating agent 302.1) is produced in the floor region (additional heating device 362) of the reservoir 300 around the suction opening 372 located at the bottom of the reservoir 300 and a liquid cylinder along the heating device 360.

At least sufficient suction conditions are thus provided, because the additional heating device 362 close to the floor builds up a planar liquid cushion and the vertical liquid cylinder around the heating device 360 represents a liquid column, which places the liquid cushion lying at the bottom of the reservoir under pressure and is in fluid communication with it. It is therefore further guaranteed that the liquid cushion lying at the bottom is always in contact with frozen operating agent 302.2, whereby a continuous heat transfer between these two layers is insured.

In thawing mode A all open-loop control, closed-loop control and/or monitoring circuits are deactivated. Thus the motorized valve 350 cannot control or regulate thawing operation. As in preheating mode V, an overheating protection for the operating agent 302 takes over the internal control/regulation of the preheating device 310. If, after a certain period of time, it can be assumed that there is a certain degree of liquefaction of the operating agent 302 around the suction opening 372 in the suction region 301, the thawing mode A can be switched to the preheating mode V by opening the faucet 342. As already described above, in this operating case, coolant liquid flows through the internal combustion engine 100 and the reservoir 300. This means that thawing of the operating agent 302 will be continued, but at reduced speed however, because the internal combustion engine 100 will also be heated in parallel thereto.

Should the preheating of the internal combustion engine 100 be occurring too slowly in this case, the faucet 346 can be opened, so that a volume flow of preheated coolant liquid through the internal combustion engine 100 becomes greater. If the coolant liquid in the internal combustion engine 100 has reached the start temperature, the internal combustion engine 100 is started. The preheating device 310 will be switched off, the faucets 332, 342 will be closed and the engine pump 140 takes over building up of the pressure and thus circulation of the coolant liquid. The thawing or heating of the operating agent 302 will preferably be continued even when the internal combustion engine 100 is running. Since, when the internal combustion engine 100 is running, all closed-loop control, open-loop control and/or monitoring circuits are active, the motorized valve 350 takes over the temperature control or regulation in the reservoir 300. A circulation of the coolant liquid through the reservoir 300 is reversed in this operating case compared to the preheating mode V, the non-return valve 352 blocks the bypass 352.

For an emergency start (emergency start mode N, cf. FIG. 2) no operating actions of a rail vehicle driver in a machine room are envisioned—for example opening faucets. In extraordinary situations it is necessary to start the internal combustion engine 100 immediately. This means that the faucets 342, 346 can remain in the open position although the internal combustion engine 100 is starting. In this case the pressure-limiting valve 320 protects the preheating device 310 from too great a pressure in the coolant liquid. A flow direction of the coolant liquid through the reservoir 300 of the operating agent 302, reverses automatically, the non-return valve 352 closes and the motorized valve 350 takes over the open-loop control/closed-loop control of the temperature of the operating agent 302.

FIG. 5 shows an alternate form of embodiment of the vehicle drive 1, wherein the preheating circuit 32 has a direction of flow reversed from that given above. Here the non-return valve 352 transitions into a faucet 380 and the pressure-limiting valve 320 transitions into a non-return valve 382. With such a form of embodiment of the invention all of the operating cases described above can be realized, i.e. the operating mode B with internal combustion engine 100 switched on, the preheating mode V, the thawing mode A and the emergency start mode N.

In accordance with the invention these four modes B, V, A, N can be realized with just fluid-mechanical modules without an additional pump. In all modes B, V, A, N (operating cases) an overheating of the operating agent 302 and, with the preheating device 310 switched on, a freezing of the operating agent 302, in particular of a urea solution 302, will be suppressed. Furthermore, not only does the heating device 360 guarantee a thawing and heating, but the suction region 301 will preferably be heated with the additional heating 362 especially connected in parallel or in series with the heating device 360. By means of this arrangement, in the event of icing up, the urea solution 302 will be thawed quickly and sustainably in the suction region 301, which enables the internal combustion engine 100 to be put into service quickly.

In accordance with the invention a complete heating of the reservoir 300 is obsolete, because the supply of liquid operating agent 302 is guaranteed in this way. The system does not need any additional electrical heating, since the preheating device 310 is preferably fuel-driven. Naturally the preheating device 310 can also be an electrical preheating device 310. By means of the throttle 344 and the faucet 346 the modes B, V, A, N can be set or prioritized, in order to be able to realize an individual reaction for specific environmental conditions. A change from preheating mode V into operating mode B and possibly in the reverse direction leads in each case to a switchover of a flow direction of the coolant liquid in a heating circuit of the reservoir 300. Through this the motorized valve 350 will be automatically bridged if need be by the non-return valve 352 or set in the flow direction of the coolant liquid.

In emergency start mode N the pressure-limiting valve 320 protects the preheating device 310. And in the event of a pump 312 in the preheating device 310 that is too weak, a further pump can be connected-in in series before or after the preheating device 310. In accordance with the invention, all faucets 332, 334, 342, 346, 380, 422, 424 are able to be actuated manually or automatically (electrically, pneumatically). Instead of one or a plurality of faucets 332, 334, 342, 346, 380, 422, 424, one or a plurality of valves 332, 334, 342, 346, 380, 422, 424 can also be employed, which are preferably able to be actuated manually or automatically (electrically, pneumatically).

The invention claimed is:
1. A method for heating an operating agent for a rail vehicle, which comprises the steps of:
   pumping a coolant liquid just by means of a single pump through a coolant circuit of an internal combustion engine in an operating mode of an operating agent heating system;

pumping the coolant liquid by the single pump through a main heating circuit of the operating agent heating system for heating the operating agent in a reservoir in the operating mode;

dividing the main heating circuit into two sub-circuits of a preheating circuit though which the coolant liquid flows in a preheating mode of the operating agent heating system, wherein the coolant liquid heated by a preheating device will be pumped in the two sub-circuits through which the coolant liquid flows, by means of a pump of the preheating device through the two sub-circuits; and performing a thawing mode with the operating agent heating system, where the coolant liquid heated by the preheating device is pumped by the pump of the preheating device through only a sub-circuit of the two sub-circuits of the preheating circuit which leads through the reservoir.

2. The method according to claim 1, which further comprises pumping the coolant liquid after being heated in opposite directions through the two sub-circuits.

3. The method according to claim 1, which further comprises selecting a reducing agent for after-treatment of exhaust gas as the operating agent.

4. An operating agent heating system for a rail vehicle, comprising:

a coolant circuit for an internal combustion engine and having a pump;

a main heating circuit for heating an operating agent in a reservoir and connected to said coolant circuit;

a coolant liquid able to be circulated through said main heating circuit is pumped by means of said pump of said coolant circuit through said main heating circuit in an operating mode of the operating agent heating system;

said main heating circuit having a preheating line and a preheating device with a preheater pump, said main heating circuit being able to be reconfigured by means of said preheating line and said preheater pump of said preheating device into a preheating circuit, by means of said preheating device the internal combustion engine and/or an operating agent in the reservoir is or are able to be preheated, the operating agent heating system has said pump of said coolant circuit and said preheater pump of said preheating device; and said preheating circuit having two sub-circuits, and, in a preheating mode of said operating agent heating system, the coolant liquid can be circulated in said two sub-circuits, and in the preheating mode, the coolant liquid is pumped through said two sub-circuits of said preheating device by said preheater pump of said preheating device.

5. The operating agent heating system according to claim 4, further comprising an upstream faucet, a downstream faucet, and a throttle, said main heating circuit is able to be brought into fluid communication with said coolant circuit upstream by means of said upstream faucet and downstream by means of said downstream faucet and said throttle;

wherein said main heating circuit has a valve by means of which, on a basis of a temperature of the operating agent, a coolant liquid flow through said main heating circuit is able to be set;

wherein said main heating circuit has at least one heating device in the reservoir, by means of said heating device a column and if necessary a cushion close to a floor of the operating agent is able to be heated or thawed;

further comprising an additional heating device; and further comprising a suction nozzle having a suction opening formed therein, a suction region of the operating agent in the reservoir or said suction opening of said suction nozzle is able to be heated or thawed by means of said additional heating device.

6. The operating agent heating system according to claim 5, further comprising two faucets, said preheating line with said preheating device is coupled into said main heating circuit, wherein said preheating line is connected to said main heating circuit upstream and downstream of said heating device and is able to be brought into fluid communication with said main heating circuit by means of said two faucets.

7. The operating agent heating system according to claim 5, wherein:

in the preheating mode the coolant liquid is able to flow in parallel through said coolant circuit of the internal combustion engine in one of said sub-circuits of said preheating circuit.

8. The operating agent heating system according to claim 7, wherein said main heating circuit has a non-return valve, a valve and lines, the operating agent heating system is embodied such that, for a switch from the preheating mode into the operating mode and vice versa, a switchover in a direction of circulation is brought about by said lines of said main heating circuit, wherein, in the preheating mode, said valve in said main heating circuit is bridged over via said non-return valve in said main heating circuit.

9. The operating agent heating system according to claim 7, wherein:

said preheating line has faucets disposed therein; and said main heating circuit has a faucet, and in a thawing mode of the operating agent heating system, the coolant liquid is able to be circulated only in one of said sub-circuits of said preheating circuit that leads through the reservoir, wherein said faucet of said main heating circuit or of another said sub-circuits of said preheating circuit is closed and said faucets in said preheating line are opened.

10. The operating agent heating system according to claim 7, wherein said pump of said cooling circuit is an internal combustion engine-driven pump or an electrically-driven pump;

further comprising a faucet and a throttle connected in parallel in said main heating circuit or in a first of said sub-circuits of said preheating circuit;

further comprising a motorized valve, said motorized valve is disposed upstream of said heating device in said main heating circuit;

wherein said preheating device is embodied as a fuel-driven or an electrical preheating device;

wherein in the preheating mode and/or in a thawing mode the internal combustion engine and/or said pump of said cooling circuit is or are inactive;

wherein in said preheating line a pump is provided upstream or downstream of said preheating device;

further comprising a non-return valve, said motorized valve and said non-return valve are connected in parallel; and/or wherein a method according to claim 1 is able to be carried out by the operating agent heating system.

11. The operating agent heating system according to claim 4, wherein said preheating line has a pressure-limiting valve, said pressure-limiting valve is disposed between a pressure side of said pump of said coolant circuit and said preheating device in said preheating line, whereby said preheating device is able to be protected in an emergency start mode of the operating agent heating system.

12. The operating agent heating system according to claim 4, the operating agent heating system heats a reducing agent for after-treatment of exhaust gases.

13. The operating agent heating system according to claim 4, wherein in the preheating mode, the coolant liquid in said two sub-circuits are circulated in opposite directions.

14. A drive, comprising:
an operating agent heating system, containing:
  a coolant circuit having a pump;
  a reservoir;
  a main heating circuit for heating an operating agent in said reservoir and connected to said coolant circuit;
  a coolant liquid able to be circulated through said main heating circuit being pumped by means of said pump of said coolant circuit through said main heating circuit in an operating mode of said operating agent heating system;
  said main heating circuit having a preheating line and a preheating device with a preheater pump, said main heating circuit being able to be changed by means of said preheating line and said preheater pump of said preheating device into a preheating circuit, by means of said preheating device the operating agent in said reservoir is able to be preheated, said operating agent heating system has said pump of said coolant circuit and said preheater pump of said preheating device;
  said preheating circuit having two sub-circuits, and, in a preheating mode of said operating agent heating system, the coolant liquid can be circulated in said two sub-circuits, and in the preheating mode, the coolant liquid is pumped through said two sub-circuits of said preheating device by said preheater pump of said preheating device;
the drive configured to:
  pump the coolant liquid just by means of said pump of said coolant circuit through said coolant circuit in the operating mode of said operating agent heating system;
  pump the coolant liquid by said pump of said coolant circuit through said main heating circuit of said operating agent heating system for heating the operating agent in said reservoir in the operating mode; and
  divide said main heating circuit into said two sub-circuits of said preheating circuit though which the coolant liquid flows in the preheating mode of said operating agent heating system, wherein the coolant liquid heated by said preheating device will be pumped in said two sub-circuits through which the coolant liquid flows, by means of said preheater pump of said preheating device through said two sub-circuits.

* * * * *